(12) United States Patent
Nagata et al.

(10) Patent No.: US 10,523,138 B2
(45) Date of Patent: Dec. 31, 2019

(54) MOTOR CONTROL DEVICE

(71) Applicant: DENSO CORPORATION, Kariya, Aichi-pref. (JP)

(72) Inventors: Hiromitsu Nagata, Kariya (JP); Seiji Nakayama, Kariya (JP); Jun Yamada, Kariya (JP)

(73) Assignee: DENSO CORPORATION, Kariya (JP)

( * ) Notice: Subject to any disclaimer, the term of this patent is extended or adjusted under 35 U.S.C. 154(b) by 0 days.

(21) Appl. No.: 16/087,247

(22) PCT Filed: Feb. 13, 2017

(86) PCT No.: PCT/JP2017/005194
§ 371 (c)(1),
(2) Date: Sep. 21, 2018

(87) PCT Pub. No.: WO2017/169197
PCT Pub. Date: Oct. 5, 2017

(65) Prior Publication Data
US 2019/0103825 A1 Apr. 4, 2019

(30) Foreign Application Priority Data
Apr. 1, 2016 (JP) .................................. 2016-73980

(51) Int. Cl.
*H02P 6/08* (2016.01)
*H02P 29/00* (2016.01)
*H02P 6/12* (2006.01)
*G05B 19/406* (2006.01)

(52) U.S. Cl.
CPC .............. *H02P 6/08* (2013.01); *G05B 19/406* (2013.01); *H02P 6/12* (2013.01); *H02P 29/00* (2013.01)

(58) Field of Classification Search
CPC ..................................... H02P 6/08; H02P 6/12
USPC ............................................. 318/400.01, 700
See application file for complete search history.

(56) References Cited

U.S. PATENT DOCUMENTS 9,496,818 B2 * 11/2016 Sasaki ..................... H02P 29/68
2004/0008002 A1 1/2004 Kamio et al.

FOREIGN PATENT DOCUMENTS

| JP | 11-69864 | 3/1999 |
|----|----------|--------|
| JP | 2000-32771 | 1/2000 |
| JP | 2008-99484 | 4/2008 |
| JP | 2008-220101 | 9/2008 |

* cited by examiner

*Primary Examiner* — David Luo
(74) *Attorney, Agent, or Firm* — Nixon & Vanderhye PC

(57) ABSTRACT

A motor control device includes: a state monitoring unit that detects a power supply abnormality in which a power is not normally supplied to at least one of a rotation sensor and a motor; an abnormality determination unit that detects an abnormality of the rotation sensor based on an output signal of the rotation sensor; and a decision unit that decides whether to confirm the abnormality of the rotation sensor based on a detection result of the state monitoring unit and a detection result of the abnormality determination unit. When the state monitoring unit detects the power supply abnormality, the decision unit does not decide the abnormality of the rotation sensor even when the abnormality determination unit detects the abnormality of the rotation sensor.

9 Claims, 8 Drawing Sheets

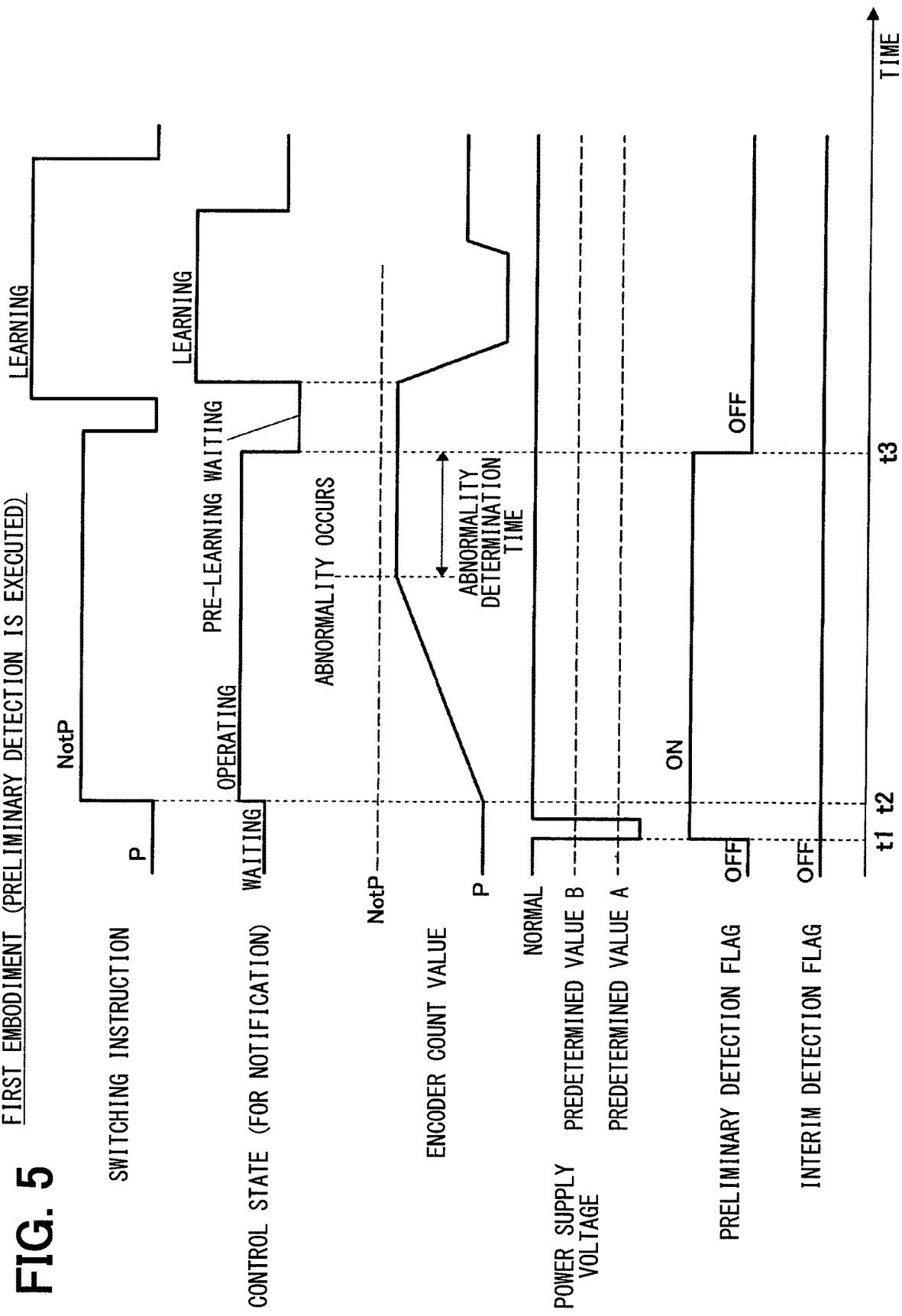

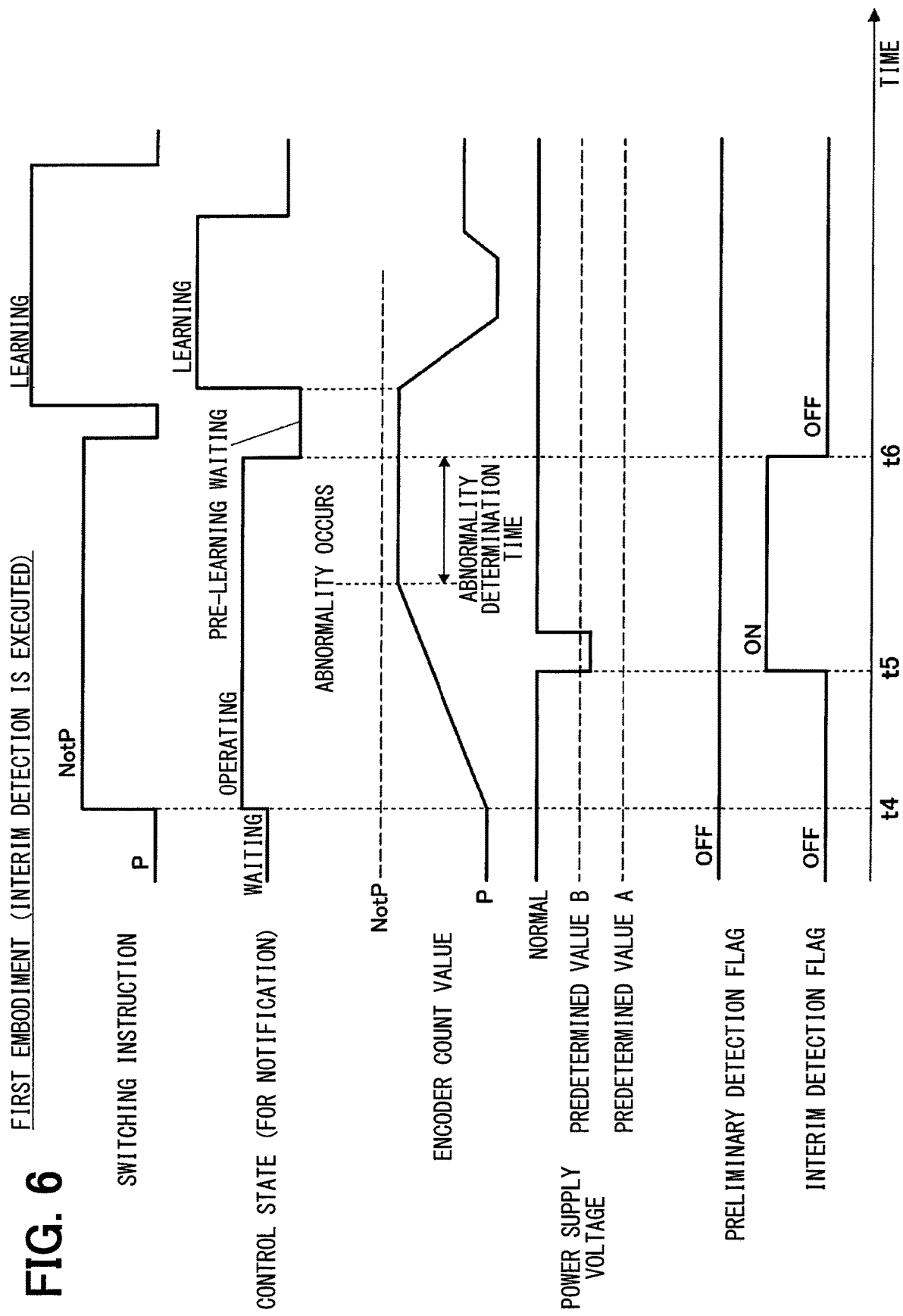

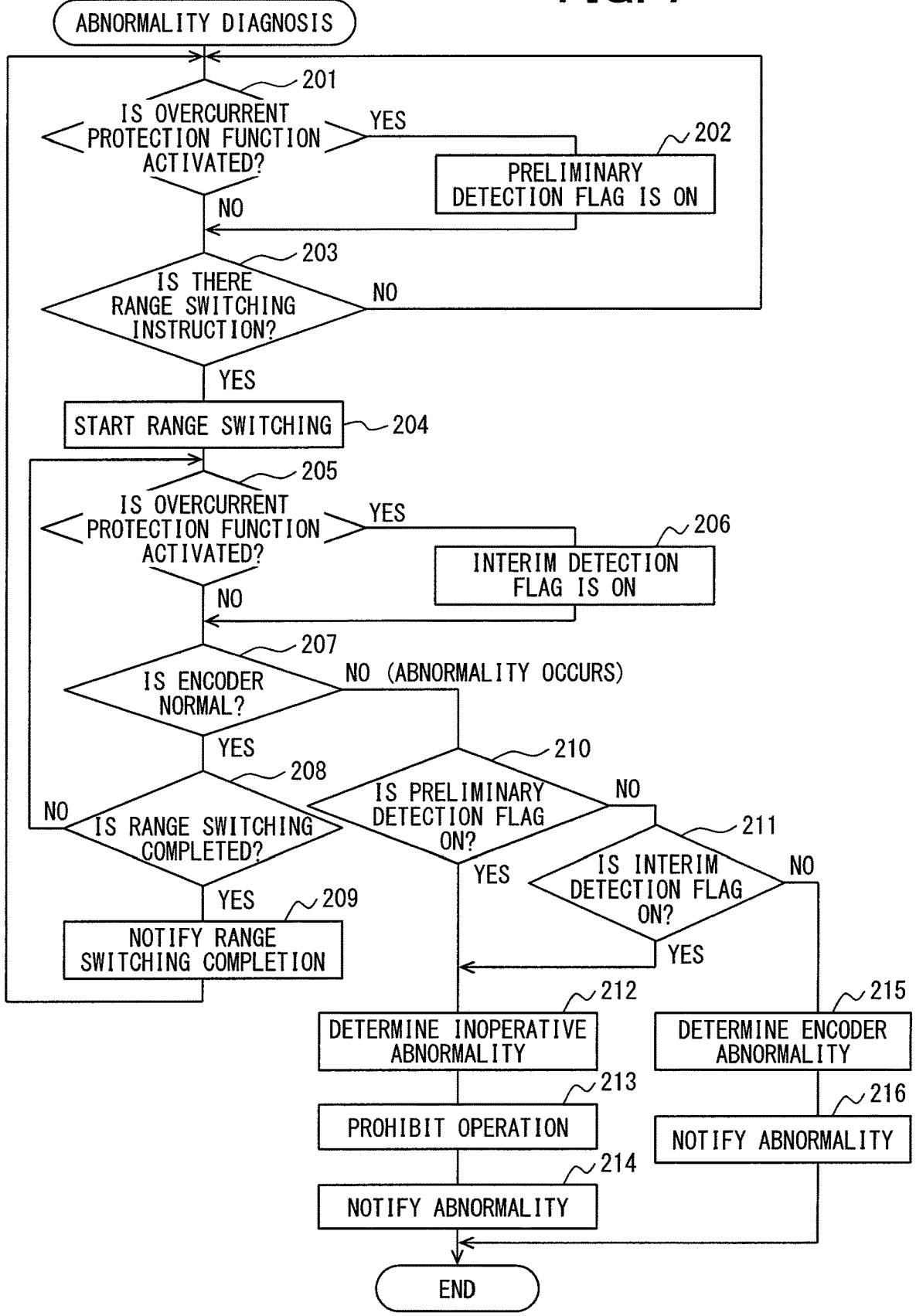

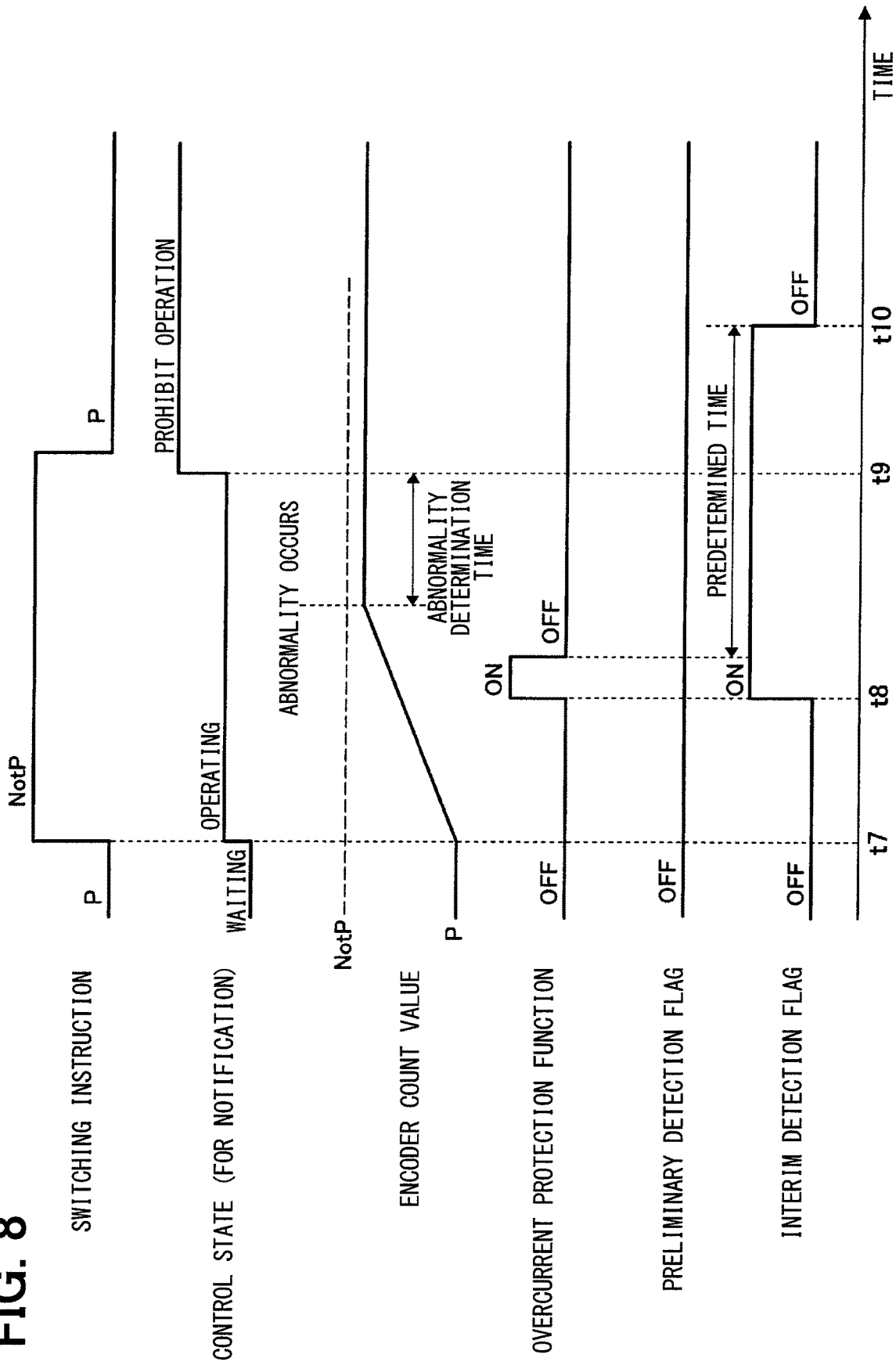

MOTOR CONTROL DEVICE

CROSS REFERENCE TO RELATED APPLICATION

This application is the U.S. national phase of International Application No. PCT/JP2017/005194 filed Feb. 13, 2017, which designated the U.S. and claims priority to Japanese Patent Application No. 2016-73980 filed on Apr. 1, 2016 the entire contents of each of which are incorporated herein by reference.

TECHNICAL FIELD

The present disclosure relates to a motor control device that controls a rotation position of a motor based on an output signal of a rotation sensor that outputs a signal according to a rotation of the motor.

BACKGROUND ART

In recent years, in automobiles, there has been an increasing tendency to change a mechanically driving system to an electrically driving system by a motor in order to satisfy demands for space saving, an improvement in assembly, an improvement in controllability, and so on. As one example of the electrically driving system, as disclosed in Patent Literature 1, there is a system that drives a range switching mechanism of a vehicle by a motor. The above system is equipped with an encoder outputting a pulse signal at every predetermined angle in synchronization with the rotation of the motor, sequentially switches energization phases of the motor based on a count value of an output signal of the encoder, and rotationally drives the motor to a target position. In addition, Patent Literature 1 discloses that the count value of the output signal of the encoder is compared with a count value of a drive signal of a motor to detect an abnormality (for example, disconnection) of the encoder.

PRIOR ART LITERATURE

Patent Literature

Patent Literature 1: JP 2004-56856 A

SUMMARY OF INVENTION

If a power supply abnormality in which a power is not normally supplied to the encoder or the motor occurs, the encoder or the motor cannot operate normally due to the power supply abnormality, and the output signal of the encoder may not be updated normally. For that reason, as Patent Literature 1, in the system that detects the abnormality of the encoder by comparing the count value of the output signal of the encoder with the count value of the drive signal of the motor, when the power supply abnormality occurs, the encoder may be erroneously determined to be abnormal despite the encoder being normal.

It is an object of the present disclosure to provide a motor control device capable of avoiding erroneous determination as an abnormality of a rotation sensor even though the rotation sensor that outputs a signal according to the rotation of a motor is normal.

According to an aspect of the present disclosure, a motor control device includes: a motor that serves as a driving source of a control target; a rotation sensor that outputs a signal according to a rotation of the motor; and a motor control unit that controls a rotation position of the motor based on an output signal of the rotation sensor. The motor control device further includes: a state monitoring unit that detects a power supply abnormality in which a power is not normally supplied to at least one of the rotation sensor and the motor; an abnormality determination unit that detects an abnormality of the rotation sensor based on the output signal of the rotation sensor; and a decision unit that decides whether to confirm the abnormality of the rotation sensor based on a detection result of the state monitoring unit and a detection result of the abnormality determination unit. When the state monitoring unit detects the power supply abnormality, the decision unit does not decide the abnormality of the rotation sensor even when the abnormality determination unit detects the abnormality of the rotation sensor.

In the above configuration, when the power supply abnormality in which the power is not normally supplied to the rotation sensor or the motor is detected, it is determined that the output signal of the rotation sensor may not be normally updated due to the power supply abnormality, and even when the abnormality of the rotation sensor is detected, the abnormality of the rotation sensor is not decided. Accordingly, the erroneous determination that the rotation sensor is abnormal even though the rotation sensor is normal is avoided when the power supply abnormality occurs.

BRIEF DESCRIPTION OF DRAWINGS

FIG. 5 is a time chart showing one execution example (No. 1) of an abnormality diagnosis according to the first embodiment.

FIG. 6 is a time chart showing another execution example (No. 2) of the abnormality diagnosis according to the first embodiment.

FIG. 7 is a flowchart showing a flow of processing of an abnormality diagnosis routine according to a second embodiment.

FIG. 8 is a time chart showing an execution example of an abnormality diagnosis according to a second embodiment.

DESCRIPTION OF EMBODIMENTS

Hereinafter, several embodiments of a motor control device will be described.

First Embodiment

A motor control device according to a first embodiment will be described with reference to FIGS. 1 to 6.

First, a configuration of a range switching control system will be described with reference to FIGS. 1 and 2.

Figure 1:
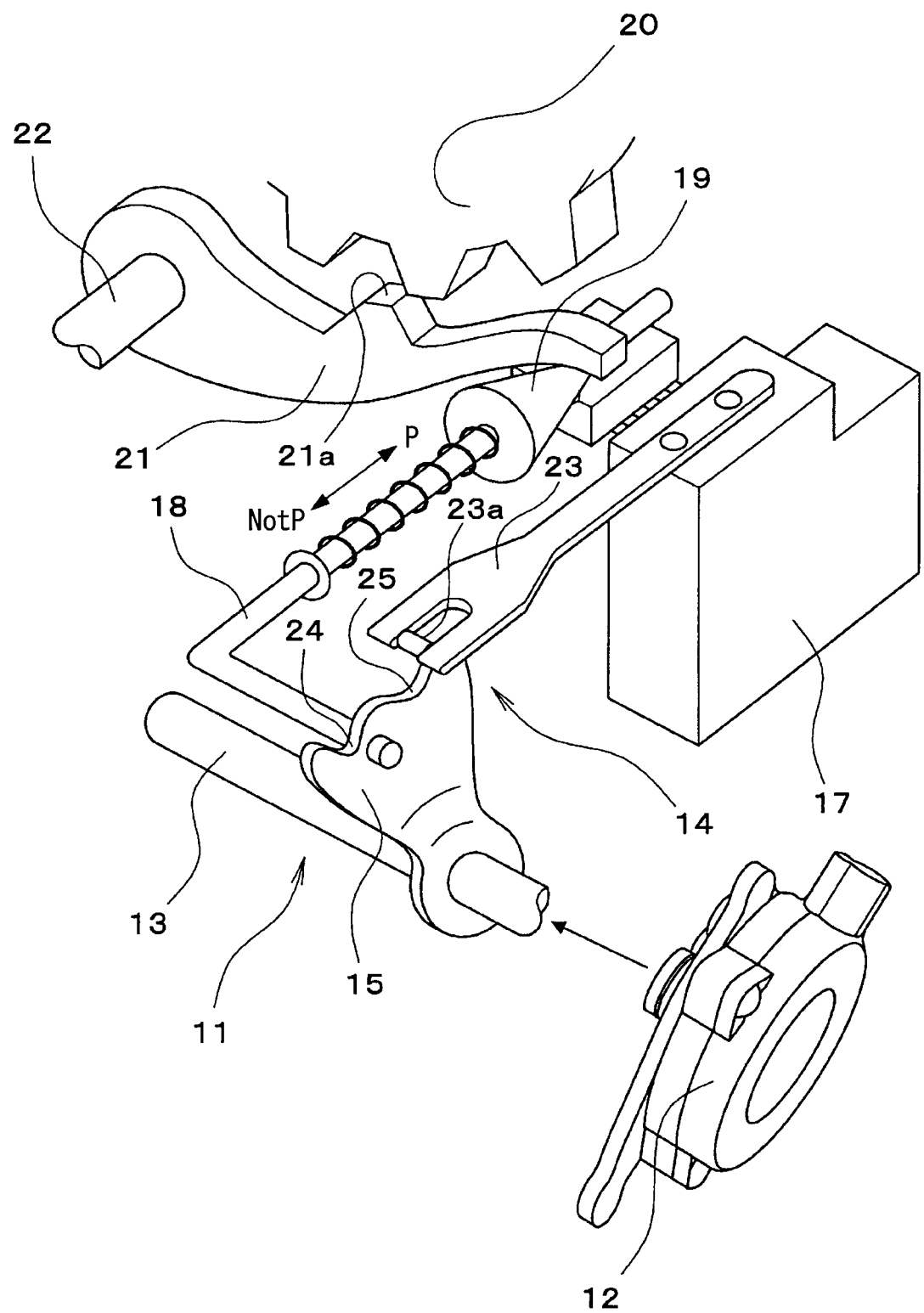
FIG. 1 is a perspective view of a range switching mechanism according to a first embodiment.

As shown in FIG. 1, a range switching mechanism 11 is a two-position range switching mechanism that switches a shift range of a vehicle between a P range and a NotP range. In the present specification, the P range means a parking range. The NotP range means another range other than the P range. The range switching mechanism 11 corresponds to a control target. A motor 12 serving as a driving source of the range switching mechanism 11 is configured by, for example, a switched reluctance motor. The motor 12 incorporates a speed reduction mechanism 26 (refer to FIG. 2) whose output shaft is connected with a manual shaft 13 of the range switching mechanism 11. A detent lever 15 is fixed to the manual shaft 13.

An L-shaped parking rod 18 is fixed to the detent lever 15. A conical body 19 provided at a tip portion of the parking rod 18 is in contact with a lock lever 21. The lock lever 21 moves up and down about a shaft 22 according to a position of the conical body 19 so as to lock and unlock a parking gear 20. The parking gear 20 is provided on an output shaft of an automatic transmission. When the parking gear 20 is locked by the lock lever 21, driving wheels of the vehicle are held in a state where rotation is stopped (that is, parking state).

On the other hand, a detent spring 23 for holding the detent lever 15 at each position of P and NotP is fixed to a support base 17. The detent lever 15 is formed with a P range holding recess portion 24 and a NotP range holding recess portion 25. When an engagement portion 23a provided at a tip of the detent spring 23 is fitted into a P range holding recess portion 24 of the detent lever 15, the detent lever 15 is held at the P range position. When the engagement portion 23a of the detent spring 23 is fitted into the NotP range holding recess portion 25 of the detent lever 15, the detent lever 15 is held at the position of the NotP range. A detent mechanism 14 for engaging and holding a rotation position of the detent lever 15 at the position of each range (that is, holding the range switching mechanism 11 at each range position) is configured by the detent lever 15, the detent spring 23 and the like.

In the P range, the parking rod 18 moves in a direction of approaching the lock lever 21, and a thick portion of the conical body 19 pushes up the lock lever 21. As a result, a protrusion portion 21a of the lock lever 21 is fitted into the parking gear 20 and the parking gear 20 is locked. As a result, an output shaft of the automatic transmission is held in a locked state (that is, a parking state).

On the other hand, in the NotP range, the parking rod 18 moves in a direction away from the lock lever 21, the thick portion of the conical body 19 comes out from the lock lever 21 and the lock lever 21 descends. As a result, the protrusion portion 21a of the lock lever 21 is disengaged from the parking gear 20 and the parking gear 20 is unlocked. As a result, the output shaft of the automatic transmission is held in a rotatable state (that is, in a travelable state).

Figure 2:
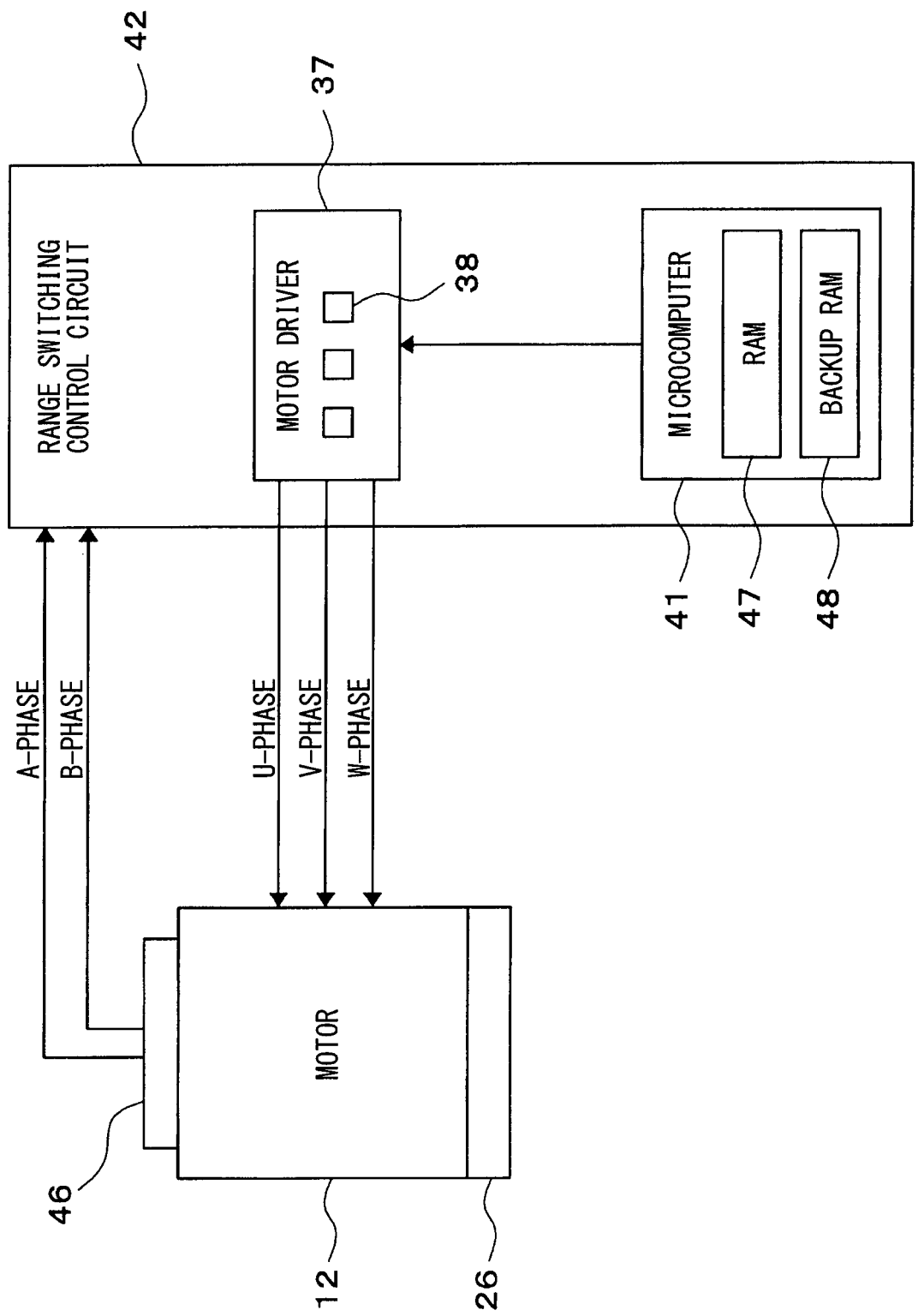
FIG. 2 is a diagram showing a schematic configuration of a range switching control system.

As shown in FIG. 2, the motor 12 is equipped with an encoder 46 for detecting a rotation angle (that is, a rotation position) of the rotor. The encoder 46 is configured by, for example, a magnetic rotary encoder. The encoder 46 is configured to output A-phase and B-phase pulse signals at predetermined angles in synchronization with the rotation of a rotor of the motor 12. The encoder 46 corresponds to a rotation sensor.

A microcomputer 41 of a range switching control circuit 42 counts both of rising and falling edges of a phase-A signal and a phase-B signal output from the encoder 46. The microcomputer 41 rotationally drives the motor 12 by switching the energization phases of the motor 12 in a predetermined order by the motor driver 37 according to a count value from the edges (hereinafter referred to as "encoder count value"). Two systems having the combination of windings of three phases (that is, a U-phase, a V-phase and a W-phase) of the motor 12 and the motor driver 37 are provided so that even if one system fails, the other system rotates the motor 12. The motor driver 37 is provided with multiple switching elements 38 (for example, MOSFET, transistors, and so on) for switching ON and OFF of energization of each phase of the motor 12.

During the rotation of the motor 12, the microcomputer 41 determines a rotational direction of the motor 12 according to the order of generation of the phase-A signal and the phase-B signal. The microcomputer 41 counts up the encoder count value in a forward rotation (for example, the rotational direction from the P range to the NotP range). The microcomputer 41 counts down the encoder count value in a reverse rotation (for example, the rotational direction from the NotP range to the P range). As a result, regardless of whether the motor 12 rotates in the forward rotation direction or the reverse rotation direction, a correspondence relationship between the encoder count value and the rotation angle of the motor 12 is maintained. For that reason, in any rotation direction of the forward rotation and the reverse rotation, the rotation position of the motor 12 is detected according to the encoder count value, and the windings of the phase corresponding to the rotation position are energized so that the motor 12 can be rotationally driven. The encoder count value is stored in a RAM 47 of the microcomputer 41.

A signal of a shift lever operation position detected by a shift switch (not illustrated) is input to the range switching control circuit 42. The microcomputer 41 of the range switching control circuit 42 switches a target range (that is, a target shift range) according to a driver's shift lever operation or the like, and rotationally drives the motor 12 according to the target range to switch the shift range. Furthermore, the microcomputer 41 displays the actual shift range after switching on a range display unit (not illustrated) installed in an instrument panel (not illustrated).

Further, a power supply voltage is supplied to the range switching control circuit 42 from a driving power supply 50 (refer to FIG. 3) such as a battery which is mounted on the vehicle through a power supply relay (not illustrated). The on/off state of the power supply relay is switched by manually operating on/off of an IG switch (not illustrated) which is a power switch. When the IG switch is turned on, the power supply relay is turned on and the power supply voltage is supplied to the range switching control circuit 42. When the IG switch is turned off, the power supply relay is turned off and the power supply to the range switching control circuit 42 is cut off.

Figure 3:
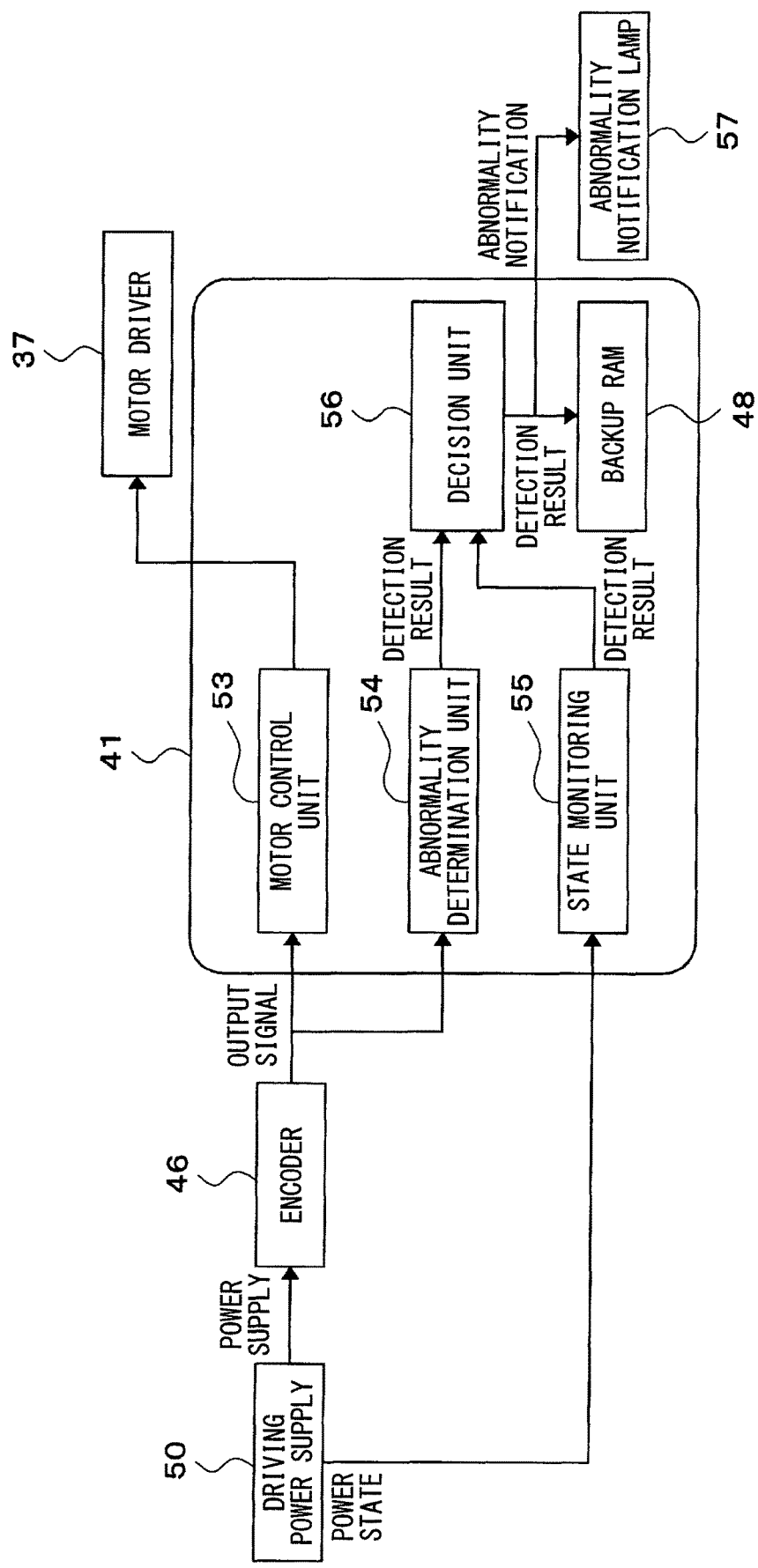
FIG. 3 is a block diagram schematically showing an abnormality diagnosis function.

When the target range is switched to another by the shift lever operation of a driver or the like, the microcomputer 41 of the range switching control circuit 42 changes the target rotation position (that is, the target count value) according to the changeover of the target range. As shown in FIG. 3, in the microcomputer 41, the motor control unit 53 executes a feedback control that sequentially switches the energization phases of the motor 12 based on the encoder count value to rotationally drive the motor 12 to the target rotation position corresponding to the target range. With the above operation, the microcomputer switches the shift range to the target range (that is, switches the switching position of the range switching mechanism 11 to the position of the target range).

Further, in the microcomputer 41, the abnormality determination unit 54 detects the abnormality of the encoder 46 based on an output signal of the encoder 46. Specifically, the abnormality determination unit 54 determines whether the abnormality of the encoder 46 is present, or not, based on whether a state in which the encoder count value is not updated during the rotational driving of the motor 12 has been continued for a predetermined abnormality determination time or more, or not.

Incidentally, if the driving power supply 50 gets in a low voltage state and the power supply abnormality in which the power is not normally supplied to the encoder 46 occurs, the encoder 46 cannot operate normally due to the power supply abnormality so that the output signal from the encoder 46 may not be normally updated. For that reason, if no countermeasures are taken, when the driving power supply 50 gets in the low voltage state and the power supply abnormality in which the power is not normally supplied to the encoder 46 occurs, even if the encoder 46 is normal, the encoder 46 may be erroneously determined to be abnormal.

Therefore, in the first embodiment, the microcomputer 41 of the range switching control circuit 42 executes an abnormality diagnosis routine of FIG. 4 to be described later, to thereby perform the following abnormality diagnosis.

As shown in FIG. 3, in the microcomputer 41, the state monitoring unit 55 detects a power supply abnormality in which the power is not normally supplied to the encoder 46 based on the state of the driving power supply 50. Specifically, the state monitoring unit 55 executes a preliminary detection for detecting the power supply abnormality based on a state of the driving power supply 50 before the motor 12 is rotationally driven. In the preliminary detection, the state monitoring unit 55 determines whether the power supply abnormality in which the power is not normally supplied to the encoder 46 is present, or not, according to whether the driving power supply 50 is in a low voltage state (for example, a voltage of the driving power supply 50 is a predetermined value A or lower) before the motor 12 is rotationally driven, or not. Further, the state monitoring unit 55 executes an interim detection for detecting the power supply abnormality based on the state of the driving power supply 50 while the motor 12 is being rotationally driven. In the interim detection, the state monitoring unit 55 determines whether the power supply abnormality in which the power is not normally supplied to the encoder 46 is present, or not, according to whether the driving power supply 50 is in the low voltage state (for example, the voltage of the driving power supply 50 is a predetermined value B or lower) during the rotational driving of the motor 12, or not.

Then, a decision unit 56 decides whether to confirm the abnormality of the encoder 46, or not, based on the detection result by the state monitoring unit 55 and the detection result by the abnormality determination unit 54. At that time, when the power supply abnormality in which the power is not normally supplied to the encoder 46 is detected by the state monitoring unit 55 and the abnormality of the encoder 46 is detected by the abnormality determination unit 54, the microcomputer 41 does not determine the abnormality of the encoder 46. In other words, when the power supply abnormality in which the power is not normally supplied to the encoder 46 is detected, the microcomputer 41 determines there is a possibility that the output signal of the encoder 46 may not be normally updated due to the power supply abnormality. Even if the abnormality of the encoder 46 is detected, the microcomputer 41 does not determine the abnormality of the encoder 46. As a result, when the driving power supply 50 gets in the low voltage state and the power supply abnormality in which the power is not normally supplied to the encoder 46 occurs, the microcomputer 41 avoids that the encoder 46 is erroneously determined to be abnormal though the encoder 46 is normal.

Hereinafter, the processing contents of an abnormality diagnosis routine of FIG. 4 to be executed by the microcomputer 41 of the range switching control circuit 42 according to the first embodiment will be described.

Figure 4:
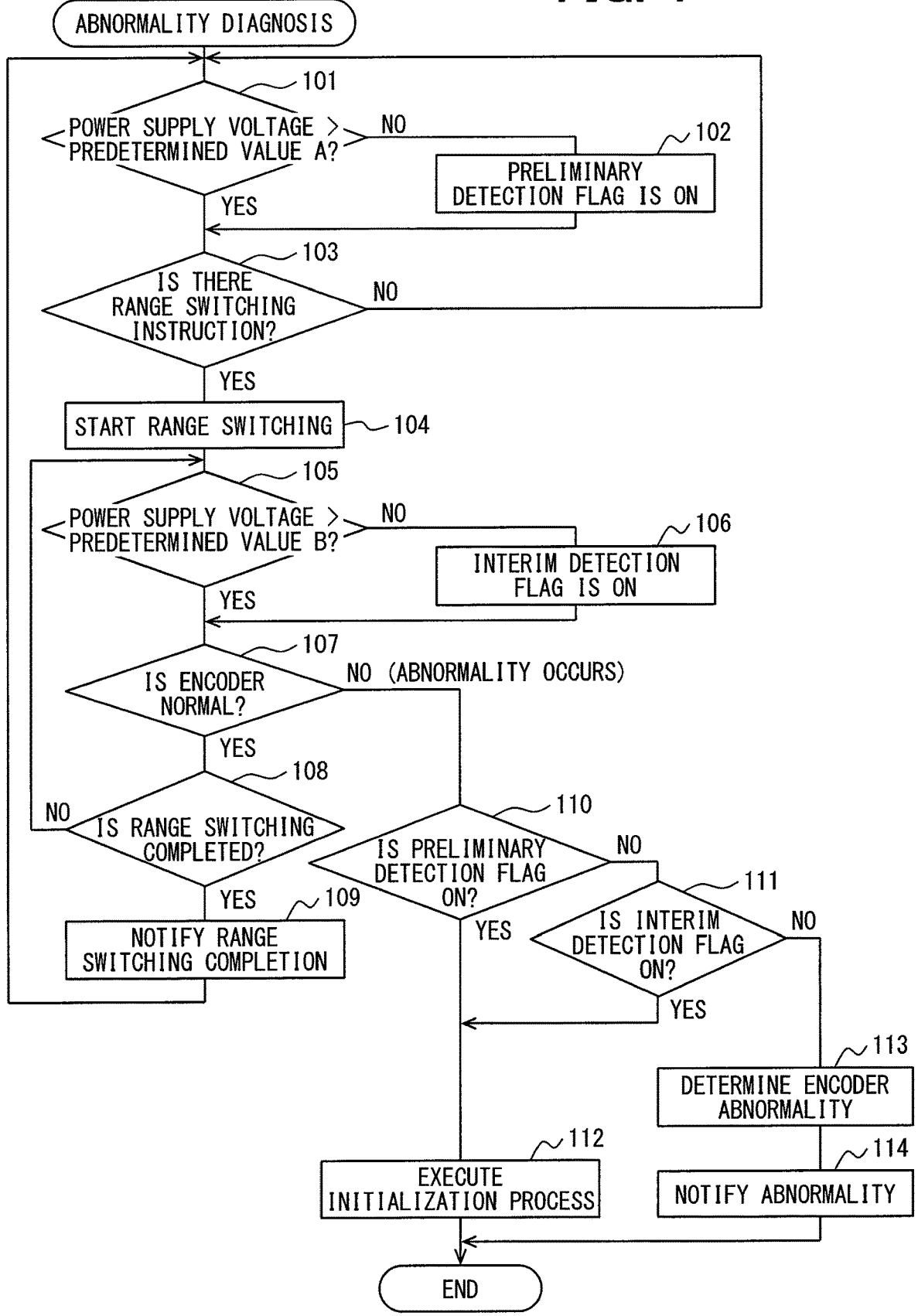
FIG. 4 is a flowchart showing a flow of processing of an abnormality diagnosis routine according to the first embodiment.

The abnormality diagnosis routine shown in FIG. 4 is executed by the microcomputer 41 during a power-on period of the range switching control circuit 42. When the present routine is started, the preliminary detection is executed before the motor 12 is rotationally driven in Steps 101 and 102. In the preliminary detection, first, in Step 101, it is determined whether the power supply voltage (that is, the voltage of the driving power supply 50) is higher than the predetermined value A, or not. The predetermined value A used in the preliminary detection represents a voltage at which a function for rotationally driving the motor 12 is no longer executed, for example, a voltage (hereinafter referred to as "encoder unreadable voltage") at which the encoder pulse (a pulse signal of the encoder 46) is no longer readable whereby the motor 12 cannot be driven and the encoder count (count of the encoder pulse) stops. The predetermined value A is set to be smaller than the predetermined value B used for the interim detection. Since the encoder unreadable voltage is lower than a torque guarantee voltage to be described later, the predetermined value A needs to be set to a value smaller than the predetermined value B.

If it is determined in Step 101 that the power supply voltage is higher than the predetermined value A, it is determined that the power is normally supplied to the encoder 46, and the process proceeds to Step 103.

On the other hand, if it is determined in Step 101 that the power supply voltage is equal to or lower than the predetermined value A (that is, the driving power supply 50 is in the low voltage state), it is determined that the power supply abnormality in which the power is not normally supplied to the encoder 46 is present, and the process proceeds to Step 102. In Step S102, after a preliminary detection flag for encoder failure has been set to "ON" meaning that the power supply abnormality in which the power is not normally supplied to the encoder 46 before the motor 12 is rotationally driven is detected, the process proceeds to Step 103.

In Step 103, it is determined whether a range switching instruction has been generated, or not, for example, based on whether the target range has been switched, or not. If it is determined in Step 103 that no range switching instruction has been generated, the process returns to Step 101.

Thereafter, when it is determined in Step 103 that the range switching instruction has been generated, the process proceeds to Step 104 and the range switching is started. In the range switching, the energization phases of the motor 12 are sequentially switched based on the encoder count value, and the motor 12 is rotationally driven to the target rotation position corresponding to the target range.

Thereafter, the interim detection is executed during the rotational driving of the motor 12 in Steps 105 and 106. In the interim detection, first, in Step 105, it is determined whether the power supply voltage is higher than the predetermined value B, or not. The predetermined value B used for the interim detection is a voltage at which a performance of the motor 12 can be no longer satisfied, for example, a voltage at (hereinafter referred to as "torque guaranteed voltage") which the detent lever 15 can be no longer rotated due to an insufficient torque of the motor 12, to thereby stop the encoder count. The voltage is set to a value larger than the predetermined value A used in the preliminary detection. Since the torque guaranteed voltage is higher than the encoder unreadable voltage described above, the predetermined value B needs to be set to a value larger than the predetermined value A.

If it is determined in Step 105 that the power supply voltage is higher than the predetermined value B, it is determined that the power is normally supplied to the encoder 46, and the process proceeds to Step 107.

On the other hand, if it is determined in Step 105 that the power supply voltage is equal to or lower than the predetermined value B (that is, the driving power supply 50 is in the low voltage state), it is determined that the power supply abnormality in which the power is not normally supplied to the encoder 46 is present, and the process proceeds to Step 106. In Step S106, after an interim detection flag for encoder failure has been set to "ON" meaning that the power supply abnormality in which the power is not normally supplied to the encoder 46 during the rotational driving of the motor 12 is detected, the process proceeds to Step 107.

In Step 107, the abnormality determination unit 54 determines whether the abnormality of the encoder 46 is present, or not, based on whether a state in which the encoder count value is not updated during the rotational driving of the motor 12 has been continued for a predetermined abnormality determination time or more, or not, and it is determined whether the encoder 46 is normal, or not.

In Step 107, if it is determined that the encoder 46 is normal (that is, no abnormality), the process proceeds to Step 108. Whether the range switching has been completed, or not, is determined in Step 108 based on, for example, whether the motor 12 has rotated to the target rotation position, or not (that is, whether the encoder count value has reached the target count value, or not).

If it is determined in Step 108 that the range switching has not been completed, the process returns to Step 105. Thereafter, when it is determined in Step 108 that the range switching has been completed, the process proceeds to Step 109 and the range switching completion is notified.

On the other hand, if it is determined in Step 107 that the encoder 46 is abnormal, the process proceeds to Step 110, and it is determined whether the preliminary detection flag is "ON, or not".

If it is determined in Step 110 that the preliminary detection flag is "ON", the process proceeds to Step 112. In that case, it is determined that there is a possibility that the output signal of the encoder 46 has not been normally updated due to a fact that the driving power supply 50 gets in the low voltage state before the rotational driving of the motor 12 and the power supply abnormality in which the power is not normally supplied to the encoder 46 occurs, and it is not determined that the encoder 46 is abnormal.

On the other hand, if it is determined in Step 110 that the preliminary detection flag is "OFF", the process proceeds to Step 111, and it is determined whether the interim detection flag is "ON", or not.

If it is determined in Step 111 that the interim detection flag is "ON", the process proceeds to Step 112. In that case, it is determined that there is a possibility that the output signal of the encoder 46 has not been normally updated due to the fact that the driving power supply 50 gets in the low voltage state during the rotational driving of the motor 12, and the power supply abnormality in which the power is not normally supplied to the encoder 46 occurs, and it is not determined that the encoder 46 is abnormal.

In Step 112, an initialization process for returning a control state of the motor 12 to an initial state (that is, a state at the time of system startup) is executed. In the initialization process, for example, the target range is reset to the initial value (for example, the P range), and a learning value of a reference position for controlling the rotation position of the motor 12 is reset to an initial value (for example, a design value or a previous value). Further, the preliminary detection flag is reset to "OFF" and the interim detection flag is reset to "OFF".

On the other hand, if it is determined that the preliminary detection flag is "OFF" in Step 110, and it is determined that the interim detection flag is "OFF" in Step 111, the process proceeds to Step 113, and the abnormality of the encoder 46 is determined. Thereafter, the process proceeds to Step 114, in which an abnormality notification lamp 57 installed in an instrument panel of a driver's seat is turned on or blinked to notify the abnormality of the encoder 46. In addition, and abnormality information (for example, abnormality code, or the like) on the encoder 46 is stored in a backup RAM 48 of the microcomputer 41.

Next, an execution example of the abnormality diagnosis according to the first embodiment will be described with reference to time charts of FIGS. 5 and 6.

As shown in FIG. 5, the preliminary detection is executed before the motor 12 is rotationally driven. In the preliminary detection, it is determined whether the power supply voltage is higher than the predetermined value A, or not. The preliminary detection flag is set to "ON" at a time t1 when the power supply voltage becomes equal to or lower than the predetermined value A.

When the power supply voltage becomes equal to or lower than the predetermined value A, the encoder pulse cannot be read. At that timing, the internal parts of the motor 12 may be rotated by vibration of the vehicle and the encoder count value may be updated. For that reason, when the power supply voltage becomes equal to or lower than the predetermined value A, the encoder pulses cannot be counted, as a result of which an actual position of the internal parts and a position at which the energization is attempted may become inappropriate. This causes a possibility that the encoder 46 is determined to be abnormal.

Thereafter, the target range is switched from the P range to the NotP range, and the range switching is started at a time point t2 at which the range switching instruction is generated. In the range switching, the energization phases of the motor 12 are sequentially switched based on the encoder count value, and the motor 12 is rotationally driven to the target rotation position corresponding to the target range.

The interim detection is executed during the rotational driving of the motor 12. In the interim detection, it is determined whether the power supply voltage is higher than the predetermined value B, or not. When the power supply voltage is higher than the predetermined value B, the interim detection flag is kept "OFF".

Further, during rotational driving of the motor 12, the abnormality detection of the encoder 46 is executed. In the abnormality detection, it is determined whether the abnormality of the encoder 46 is present, or not, based on whether a state in which the encoder count value is not updated has been continued for a predetermined abnormality determination time or more, or not. When it is determined that the encoder 46 is abnormal, it is determined whether the preliminary detection flag or the interim detection flag is "ON", or not. When it is determined that the preliminary detection flag is "ON", the abnormality of the encoder 46 is not determined.

Further, the initialization process is executed at a time t3 when the preliminary detection flag is determined to be "ON" and the encoder 46 is determined to be abnormal. In the initialization process, the learning value of the reference position is reset to the initial value, the state is returned to a pre-learning waiting state, and the target range is reset to the P range. Furthermore, the preliminary detection flag and the interim detection flag are reset to "OFF". This is to use the preliminary detection flag and the interim detection flag even at a next abnormality diagnosis when the abnormality of the encoder 46 has not been determined.

Upon returning to the pre-learning waiting state through the initialization process, a learning command is generated and the reference position learning is executed. In the reference position learning, an abutment control for rotating the motor 12 is performed until abutting against a limit position of a movable range of the range switching mechanism 11, and the limit position is learned as a reference position. Specifically, a "P range wall abutment control" is performed in which the motor 12 is rotated until the engagement portion 23*a* of the detent spring 23 abuts against a P range wall (that is, a side wall of the P range holding recess portion 24) which is a limit position on the P range side of the movable range of the range switching mechanism 11. The limit position on the P range side is learned as the reference position on the P range side.

The reason for performing the initialization process is because other information is not also appropriate due to the abnormality, and therefore it is considered that the diagnosis should be performed again after refreshing. It is conceivable that the detection of abnormality from information again acquired in a state of probably returning to normal makes it hard to lead to another erroneous detection.

Further, as shown in FIG. 6, the preliminary detection is executed before the rotational driving of the motor 12 is rotated and when the power supply voltage is higher than the predetermined value A, the preliminary detection flag is kept "OFF".

Thereafter, at a time t4 at which the range switching instruction is generated, the range switching is started, and the motor 12 is rotationally driven to the target rotation position.

The interim detection is executed during the rotational driving of the motor 12, and at a time t5 when the power supply voltage becomes equal to or lower than the predetermined value B, the interim detection flag is set to "ON".

In addition, the abnormal detection of the encoder 46 is executed during the rotational driving of the motor 12, and when it is determined that the encoder 46 is abnormal, it is determined whether the preliminary detection flag or the interim detection flag is "ON", or not. When it is determined that the interim detection flag is "ON", the abnormality of the encoder 46 is not determined.

Further, the initialization process is executed at a time t6 when the interim detection flag is determined to be "ON" and the encoder 46 is determined to be abnormal. Upon returning to the pre-learning waiting state through the initialization process, a learning command is generated and the reference position learning is executed.

In the first embodiment described above, the state monitoring unit 55 determines whether the power supply abnormality in which the power is not normally supplied to the encoder 46 is present, according to whether the driving power supply 50 is in a low voltage state (for example, a voltage of the driving power supply 50 is a predetermined value or lower). In addition, the abnormality determination unit 54 determines whether the abnormality of the encoder 46 is present, based on whether a state in which the encoder count value is not updated during the rotational driving of the motor 12 has been continued for a predetermined abnormality determination time or more. When the power supply abnormality in which the power is not normally supplied to the encoder 46 is detected and the abnormality of the encoder 46 is detected, the abnormality of the encoder 46 is not decided. As a result, when the driving power supply 50 gets in the low voltage state and the power supply abnormality in which the power is not normally supplied to the encoder 46 occurs, it is avoided that the encoder 46 is erroneously determined to be abnormal though the encoder 46 is normal.

In the first embodiment, the preliminary detection to detect the power supply abnormality based on the state of the driving power supply 50 before the motor 12 is driven to rotate, and the interim detection to detect the power supply abnormality based on the state of the driving power supply 50 during the rotational driving of the motor 12 are executed. As a result, even when the output signal of the encoder 46 has not been normally updated due to the fact that the driving power supply 50 becomes in the low voltage state and the power supply abnormality occurs not only during the rotational driving of the motor 12 but also before the rotational driving of the motor 12, the erroneous determination that the encoder 46 is abnormal can be avoided.

Furthermore, in the first embodiment, when the power supply abnormality in which the power is not normally supplied to the encoder 46 has been detected and the abnormality of the encoder 46 has been detected (that is, when the abnormality of the encoder 46 is not decided), the initialization process to return the control state of the motor 12 to the initial state is executed. As a result, the control of the motor 12 can be resumed from the initial state (that is, the state at the time of system startup), and the control of the motor 12 can be continued onboard.

In the first embodiment, both of the preliminary detection and the interim detection are executed. However, the present disclosure is not limited to the above configuration, and only one of the preliminary detection and the interim detection may be executed.

In the first embodiment, the initialization process is executed when the power supply abnormality is detected and the abnormality of the encoder 46 is detected. Alternatively, the operation of the motor 12 may be prohibited.

Second Embodiment

Next, a motor control device according to a second embodiment will be described with reference to FIGS. 7 and 8. However, a description of substantially the same or similar parts as those in the first embodiment will be omitted or simplified, and parts different from the first embodiment will be mainly described.

When an energizing current of the motor 12 exceeds a predetermined upper limit value, the microcomputer 41 of the range switching control circuit 42 activates an overcurrent protection function that maintains the switching element 38 of the motor driver 37 in an inoperative state (that is, an OFF state in which the motor 12 is not energized). This avoids that an overcurrent flows through the range switching control circuit 42, the motor 12, and the like.

Incidentally, if the switching element 38 gets in the inoperative state and the power supply abnormality in which the power is not normally supplied to the motor 12 occurs, the motor 12 cannot operate normally due to the power supply abnormality, and the output signal from the encoder 46 may not be normally updated. For that reason, if no countermeasures are taken, when the switching element 38 becomes in the inoperative state and the power supply abnormality in which the power is not normally supplied to the motor 12 occurs, even if the encoder 46 is normal, the encoder 46 may be erroneously determined to be abnormal.

Therefore, in the second embodiment, the microcomputer 41 of the range switching control circuit 42 executes an abnormality diagnosis routine of FIG. 7 to be described later, to thereby perform the following abnormality diagnosis.

In the microcomputer 41, the state monitoring unit 55 detects a power supply abnormality in which the power is not normally supplied to the motor 12 based on the state of the switching element 38. Specifically, the state monitoring unit 55 executes a preliminary detection to detect the power supply abnormality based on a state of the switching element 38 before the motor 12 is rotationally driven. In the preliminary detection, the state monitoring unit 55 determines whether the power supply abnormality in which the power is not normally supplied to the motor 12 is present, or not, according to whether the switching element 38 is in the inoperative state (for example, the overcurrent protection function is activated) before the motor 12 is rotationally driven, or not. Further, the state monitoring unit 55 executes the interim detection to detect the power supply abnormality based on the state of the switching element 38 while the motor 12 is being rotationally driven. In the interim detection, the state monitoring unit 55 determines whether the power supply abnormality in which the power is not normally supplied to the motor 12 is present, or not, according to whether the switching element 38 is in the inoperative state (for example, the overcurrent protection function is activated) while the motor 12 is rotationally driven, or not.

Then, a decision unit 56 decides whether to confirm the abnormality of the encoder 46, or not, based on the detection result by the state monitoring unit 55 and the detection result by the abnormality determination unit 54. At that time, when the power supply abnormality in which the power is not normally supplied to the motor 12 is detected by the state monitoring unit 55 and the abnormality of the encoder 46 is detected by the abnormality determination unit 54, the microcomputer 41 does not decide the abnormality of the encoder 46 and decides that the power supply is abnormal due to the inoperative of the switching element 38. In other words, when the power supply abnormality in which the power is not normally supplied to the motor 12 is detected, the microcomputer 41 determines that there is a possibility that the output signal of the encoder 46 may not be normally updated due to the power supply abnormality. Even if the abnormality of the encoder 46 is detected, the microcomputer 41 does not decide the abnormality of the encoder 46. As a result, when the switching element 38 gets in the inoperative state and the power supply abnormality in which the power is not normally supplied to the motor 12 occurs, it is avoided that the encoder 46 is erroneously determined to be abnormal though the encoder 46 is normal.

Hereinafter, the processing contents of an abnormality diagnosis routine of FIG. 7 to be executed by the microcomputer 41 of the range switching control circuit 42 according to the second embodiment will be described.

The abnormality diagnosis routine shown in FIG. 7 is executed by the microcomputer 41 during a power-on period of the range switching control circuit 42. When the present routine is started, the preliminary detection is executed before the motor 12 is rotationally driven in Steps 201 and 202. In the preliminary detection, first in Step 201, it is determined whether the overcurrent protection function is activated (that is, the switching element 38 is inoperative state), or not.

If it is determined in Step 201 that the overcurrent protection function is not activated, it is determined that power is normally supplied to the motor 12, and the process proceeds to Step 203.

On the other hand, if it is determined in Step 201 that the overcurrent protection function is activated (that is, the switching element 38 is inoperative state), it is determined that power supply abnormality in which the power is not normally supplied to the motor 12 is present, and the process proceeds to Step 202. In Step S202, after a preliminary detection flag for encoder failure has been set to "ON" meaning that the power supply abnormality in which the power is not normally supplied to the motor 12 before the motor 12 is rotationally driven is detected, the process proceeds to Step 203.

In Step 203, it is determined whether a range switching instruction has been issued, or not. If it is determined in Step 203 that no range switching instruction has been generated, the process returns to Step 201. Thereafter, when it is determined in Step 203 that the range switching instruction has been generated, the process proceeds to Step 204 and the range switching is started.

Thereafter, the interim detection is executed during the rotational driving of the motor 12 in Steps 205 and 206. In the interim detection, first in Step 205, it is determined whether the overcurrent protection function is activated (that is, the switching element 38 is inoperative state), or not.

If it is determined in Step 205 that the overcurrent protection function is not activated, it is determined that power is normally supplied to the motor 12, and the process proceeds to Step 207.

On the other hand, if it is determined in Step 205 that the overcurrent protection function is activated (that is, the switching element 38 is inoperative state), it is determined that power supply abnormality in which the power is not normally supplied to the motor 12 is present, and the process proceeds to Step 206. In Step S206, after an interim detection flag for encoder failure has been set to "ON" meaning that the power supply abnormality in which the power is not normally supplied to the motor 12 during the rotational driving of the motor 12 is rotationally driven is detected, the process proceeds to Step 207.

In Step 207, the abnormality determination unit 54 determines whether the abnormality of the encoder 46 is present, or not, based on whether a state in which the encoder count value is not updated during the rotational driving of the motor 12 has been continued for a predetermined abnormality determination time or more, or not, and it is determined whether the encoder 46 is normal, or not.

In Step 207, if it is determined that the encoder 46 is normal (that is, no abnormality), the process proceeds to Step 208. In Step 208, it is determined whether the range switching has been completed, or not.

If it is determined in Step 208 that the range switching has not been completed, the process returns to Step 205. Thereafter, when it is determined in Step 208 that the range switching has been completed, the process proceeds to Step 209 and the range switching completion is notified.

On the other hand, if it is determined in Step 207 that the encoder 46 is abnormal, the process proceeds to Step 210, and it is determined whether the preliminary detection flag is "ON, or not".

If it is determined in Step 210 that the preliminary detection flag is "ON", the process proceeds to Step 212. In that case, it is determined that there is a possibility that the output signal of the encoder 46 has not been normally updated due to a fact that the switching element 38 gets in the inoperative state before the rotational driving of the motor 12 and the power supply abnormality in which power is not normally supplied to the motor 12 occurs, and the abnormal of the encoder 46 is not determined.

On the other hand, if it is determined in Step 210 that the preliminary detection flag is "OFF", the process proceeds to Step 211, and it is determined whether the interim detection flag is "ON", or not.

If it is determined in Step 211 that the interim detection flag is "ON", the process proceeds to Step 212. In that case, it is determined that there is a possibility that the output signal of the encoder 46 has not been normally updated due to the fact that the switching element 38 becomes in the inoperative state during the rotational driving of the motor 12, and the power supply abnormality in which the power is not normally supplied to the motor 12 occurs, and it is not determined that the encoder 46 is abnormal.

In Step 212, the power supply abnormality due to the inoperative state of the switching element 38 is determined. Thereafter, the process proceeds to Step 213, and the operation of the motor 12 is prohibited. Thereafter, the process proceeds to Step 214, in which the abnormality notification lamp 57 is turned on or blinked to notify the power supply abnormality due to the inoperative state of the switching element 38. At the same time, abnormality information (for example, abnormality code or the like) on the power supply abnormality is stored in the backup RAM 48 of the microcomputer 41.

On the other hand, if it is determined that the preliminary detection flag is "OFF" in Step 210, and it is determined that the interim detection flag is "OFF" in Step 211, the process proceeds to Step 215, and the abnormality of the encoder 46 is determined. Thereafter, the process proceeds to Step 216, in which the abnormality notification lamp 57 is turned on or blinked to notify the abnormality of the encoder 46. At the same time, abnormality information (for example, abnormality code or the like) on the encoder 46 is stored in the backup RAM 48 of the microcomputer 41.

Next, an execution example of the abnormality diagnosis according to the second embodiment will be described with reference to time charts of FIG. 8.

As shown in FIG. 8, the preliminary detection is executed before the motor 12 is rotationally driven. In the preliminary detection, it is determined whether the overcurrent protection function is activated (that is, the switching element 38 is inoperative state), or not. When the overcurrent protection function is not activated, the preliminary detection flag is kept "OFF".

Thereafter, at a time t7 at which the range switching instruction is generated, the range switching is started, and the motor 12 is rotationally driven to the target rotation position.

The interim detection is executed during the rotational driving of the motor 12. In the interim detection, it is determined whether the overcurrent protection function is activated (that is, the switching element 38 is inoperative state), or not. At a time t8 when the overcurrent protection function is activated, the interim detection flag is set to "ON".

In addition, the abnormal detection of the encoder 46 is executed during the rotational driving of the motor 12, and when it is determined that the encoder 46 is abnormal, it is determined whether the preliminary detection flag or the interim detection flag is "ON", or not. When it is determined that the interim detection flag is "ON", the abnormality of the encoder 46 is not determined.

Further, at a time t9 when the interim detection flag is determined to be "ON" and the encoder 46 is determined to be abnormal, the operation of the motor 12 is prohibited and the target range is reset to the P range. At a time t10 when a predetermined time has elapsed since the activation of the overcurrent protection function is stopped, the preliminary detection flag and the interim detection flag are reset to "OFF". This is to use the preliminary detection flag and the interim detection flag even at another abnormality diagnosis when the abnormality of the encoder 46 has not been determined.

In the second embodiment described above, it is determined whether the power supply abnormality in which the power is not normally supplied to the motor 12 is present according to whether the switching element 38 is in the inoperative state (for example, the overcurrent protection function is activated). In addition, the abnormality determination unit 54 determines whether the abnormality of the encoder 46 is present based on whether a state in which the encoder count value is not updated during the rotational driving of the motor 12 has been continued for a predetermined abnormality determination time or more. When the power supply abnormality in which the power is not normally supplied to the motor 12 is detected and the abnormality of the encoder 46 is detected, the abnormality of the encoder 46 is not decided. As a result, when the switching element 38 gets in the inoperative state and the power supply abnormality in which the power is not normally supplied to the motor 12 occurs, it is avoided that the encoder 46 is erroneously determined to be abnormal though the encoder 46 is normal.

In the second embodiment, the preliminary detection to detect the power supply abnormality based on the state of the switching element 38 before the motor 12 is rotationally driven, and the interim detection to detect the power supply abnormality based on the state of the switching element 38 during the rotational driving of the motor 12 are executed. As a result, even when the output signal of the encoder 46 has not been normally updated due to the fact that the switching element 38 becomes in the inoperative state and the power supply abnormality occurs not only during the rotational driving of the motor 12 but also before the rotational driving of the motor 12, the erroneous determination that the encoder 46 is abnormal can be avoided.

Furthermore, in the second embodiment, when the power supply abnormality in which the power is not normally supplied to the motor 12 has been detected and the abnormality of the encoder 46 has been detected (that is, when the abnormality of the encoder 46 is not decided), the actuation of the motor 12 is prohibited. This makes it possible to secure safety when the power supply abnormality has been detected (for example, the P range can be maintained as much as possible).

In the second embodiment, whether the switching element 38 is in the inoperative state is determined and whether the power supply is abnormal is determined based on whether the overcurrent protection function is activated. As a result, it can be easily determined whether the power supply abnormality is present.

In the second embodiment, both of the preliminary detection and the interim detection are executed. However, the present disclosure is not limited to the above configuration, and only one of the preliminary detection and the interim detection may be executed.

In the second embodiment, the actuation of the motor 12 is prohibited when the power supply abnormality has been detected and the abnormality of the encoder 46 has been detected. Alternatively, the initialization process may be executed.

In the second embodiment, whether the switching element 38 is in the inoperative state is determined to determine whether the power supply abnormality is present based on whether the overcurrent protection function is activated. However, the present disclosure is not limited to the above configuration. For example, it may be determined based on a current flowing through the switching element 38 whether the switching element 38 is in the inoperative state to determine whether the power supply abnormality is present.

Further, the first embodiment and the second embodiment may be combined together to perform the above determination. In addition, when the first embodiment is combined with the second embodiment, the priorities of the determination of "preliminary detection" and "interim detection" of the first embodiment and "overcurrent protection function" of the second embodiment are as follows.

preliminary detection=interim detection>overcurrent protection function

In other words, the preliminary detection and the interim detection have the same priority, and are higher in priority than the overcurrent protection function. The reasons are as follows. (1) The overcurrent protection function may also be erroneously detected by a low voltage. (2) An abnormality that does not become a fatal mode occurs, and in that case, a return onboard is required as much as possible.

Further, in the respective embodiments described above, a part or all of the functions to be executed by the microcomputer 41 may be configured by hardware with one or multiple ICs or the like.

In addition, the embodiments described above exemplify a system including an encoder for outputting a pulse signal in synchronization with the rotation of the rotor of the motor. However, the present disclosure is not limited to the above configuration. For example, the configurations of the respective embodiments may be applied to a system including a rotation sensor whose output voltage changes according to the rotation of the rotor of the motor.

Further, the respective embodiments described above exemplify a system including the range switching mechanism for switching the shift range between the two ranges of the P range and the NotP range. However, the present disclosure is not limited to the above configuration. For example, even if the configurations of the respective embodiments may be applied to a system having a range switching mechanism for switching the shift range among four ranges of a P range, an R range, an N range and a D range. Alternatively, the configurations of the respective embodiments may be applied to a system having a range switching mechanism for switching the shift range among three ranges or among five or more ranges.

The configurations of the respective embodiments are not limited to automatic transmissions (for example, AT, CVT, DCT, or the like), but may be applied to a system having a range switching mechanism for switching the shift range of a transmission (for example, a speed reducer) for an electric vehicle.

In addition, the configurations of the respective embodiments are not limited to the range switching mechanism, and may be applied to a system having various position switching mechanisms using a brushless synchronous motor such as an SR motor as a driving source. Thus, the configurations of the respective embodiments can be implemented with various modifications without departing from a spirit of the present disclosure.

The present embodiment of the present disclosure has been described with reference to the specific examples. However, the present disclosure is not limited to the specific examples. The specific examples after appropriately modified in design by those skilled in the art are to be included in the scope of the present disclosure, provided that the modified specific examples include the features of the present disclosure. The respective elements of the specific examples described above and their placement, conditions, shapes, and so on are not limited to the content of the exemplification and can be appropriately modified. The respective elements included in each of the above-described specific examples can be appropriately changed in combination as long as no technical inconsistency occurs.

The invention claimed is:

1. A motor control device comprising:
a motor that serves as a driving source of a control target;
a rotation sensor that outputs a signal according to a rotation of the motor;
a motor control unit that controls a rotation position of the motor based on an output signal of the rotation sensor;
a state monitoring unit that detects a power supply abnormality in which a power is not normally supplied to at least one of the rotation sensor and the motor;
an abnormality determination unit that detects an abnormality of the rotation sensor based on the output signal of the rotation sensor; and
a decision unit that decides whether to confirm the abnormality of the rotation sensor based on a detection result of the state monitoring unit and a detection result of the abnormality determination unit, wherein
the state monitoring unit executes a preliminary detection to detect the power supply abnormality based on a state of a driving power supply before the motor is driven to rotate, and an interim detection to detect the power supply abnormality based on the state of the driving power supply while the motor is driven to rotate, and
when the state monitoring unit detects the power supply abnormality, the decision unit does not decide the abnormality of the rotation sensor even when the abnormality determination unit detects the abnormality of the rotation sensor.

2. The motor control device according to claim 1, wherein
the state monitoring unit determines the power supply abnormality according to whether a voltage of the driving power supply is equal to or less than a predetermined value A in the preliminary detection, and
the state monitoring unit determines the power supply abnormality according to whether the voltage of the driving power supply is equal to or less than a predetermined value B that is greater than the predetermined value A in the interim detection.

3. The motor control device according to claim 1, wherein
the decision unit executes an initialization process to return a control state of the motor to an initial state when the state monitoring unit detects the power supply abnormality and the abnormality determination unit detects the abnormality of the rotation sensor.

4. The motor control device according to claim 1, wherein
the decision unit prohibits an operation of the motor when the state monitoring unit detects the power supply abnormality and the abnormality determination unit detects the abnormality of the rotation sensor.

5. A motor control device comprising:
a motor that serves as a driving source of a control target;
a rotation sensor that outputs a signal according to a rotation of the motor;
a motor control unit that controls a rotation position of the motor based on an output signal of the rotation sensor;
a state monitoring unit that detects a power supply abnormality in which a power is not normally supplied to at least one of the rotation sensor and the motor;

an abnormality determination unit that detects an abnormality of the rotation sensor based on the output signal of the rotation sensor; and a decision unit that decides whether to confirm the abnormality of the rotation sensor based on a detection result of the state monitoring unit and a detection result of the abnormality determination unit wherein, the state monitoring unit detects the power supply abnormality based on a state of a switching element that switches an energization state to the motor, and the decision unit does not decide the abnormality of the rotation sensor and decides that the abnormality is caused by inoperative of the switching element when the state monitoring unit detects the power supply abnormality and the abnormality determination unit detects the abnormality of the rotation sensor.

6. The motor control device according to claim 5, wherein the state monitoring unit executes a preliminary detection to detect the power supply abnormality based on the state of the switching element before the motor is driven to rotate, and an interim detection to detect the power supply abnormality based on the state of the switching element while the motor is driven to rotate.

7. The motor control device according to claim 5, wherein the state monitoring unit determines the power supply abnormality according to whether an overcurrent protection function to maintain the switching element in an inoperative state is activated.

8. The motor control device according to claim 5, wherein the decision unit executes an initialization process to return a control state of the motor to an initial state when the state monitoring unit detects the power supply abnormality and the abnormality determination unit detects the abnormality of the rotation sensor.

9. The motor control device according to claim 5, wherein the decision unit prohibits an operation of the motor when the state monitoring unit detects the power supply abnormality and the abnormality determination unit detects the abnormality of the rotation sensor.

* * * * *